(12) United States Patent
Yankulov

(10) Patent No.: US 11,995,950 B1
(45) Date of Patent: May 28, 2024

(54) SYSTEMS AND METHODS FOR ODDS SELECTION

(71) Applicant: DK Crown Holdings Inc., Boston, MA (US)

(72) Inventor: Boyan Yankulov, Bethesda, MD (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/510,903

(22) Filed: Nov. 16, 2023

(51) Int. Cl.
| | |
|---|---|
| *G07F 17/32* | (2006.01) |
| *G06F 3/04847* | (2022.01) |
| *G06F 3/0485* | (2022.01) |
| *G06F 3/0488* | (2022.01) |

(52) U.S. Cl.
CPC ........ *G07F 17/323* (2013.01); *G06F 3/04847* (2013.01); *G06F 3/0485* (2013.01); *G06F 3/0488* (2013.01); *G07F 17/3209* (2013.01); *G07F 17/3211* (2013.01)

(58) Field of Classification Search
CPC .............. G07F 17/323; G07F 17/3209; G07F 17/3211; G06F 3/04847; G06F 3/0485; G06F 3/0488

USPC .......................................................... 463/31
See application file for complete search history.

(56) References Cited

U.S. PATENT DOCUMENTS

| | | | |
|---|---|---|---|
| 11,100,753 B1* | 8/2021 | Huke | G07F 17/3288 |
| 2022/0148364 A1* | 5/2022 | Huke | G07F 17/323 |
| 2022/0148369 A1* | 5/2022 | Huke | G07F 17/3288 |
| 2022/0198871 A1* | 6/2022 | Huke | G07F 17/3288 |

* cited by examiner

*Primary Examiner* — Pierre E Elisca
(74) *Attorney, Agent, or Firm* — Foley & Lardner LLP

(57) ABSTRACT

Described herein are systems and methods for providing graphical user interfaces for participation in wagers relating to live events. A data processing system can identify a list of wager parameters for a wager. The data processing system can generate a graphical user interface including a first interactive element including a subset of the list of wager parameters, and a second and third interactive element corresponding outcomes of the wager. The data processing system can receive a first interaction with the first interactive element to select a spread. The data processing system can update the second and third interactive elements to include updated respective odds, the updated odds generated based on the selected wager parameter. The data processing system can update a second graphical user interface to indicate the wager identifying an outcome in response to a second interaction with the second or third interactive element.

20 Claims, 6 Drawing Sheets

SYSTEMS AND METHODS FOR ODDS SELECTION

BACKGROUND

Computing systems with displays can provide graphical user interfaces for participation in wagers relating to live events. Players generally place wagers based on odds for the wagers. However, it can be challenging to select a wager based on a large spread of rapidly changing odds.

SUMMARY

It is therefore advantageous for a system to provide additional user interface features in live event wagers, such as the implementation of dynamically updating odds for outcomes of a wager based on an interaction with a set of wager parameters. Conventional interactive wagering content often lacks the option for players to view updated odds and outcomes based on a selection from a spread of values. Furthermore, odds for live events can change quickly enough during wagering that a player may have difficulty selecting an informed wager from a large listing of wager parameters in time before the odds change. Placing an informed wager can include be presented with information related to the wager, such as an outcome and odds associated with a selection of a wager parameter. Furthermore, cloud computing allows for the distributed provisioning and processing of interactive wagering features across many player devices, thereby providing improved performance when compared to other implementations. Thus, the systems and methods of this technical solution provide a technical improvement to player selection devices by providing a graphical user interface to more quickly make wager selections and see the impacts of those selections before the odds change.

At least one aspect of the present disclosure is directed to a system. The system can include one or more processors coupled to memory. The one or more processors may identify a list of wager parameters for a wager relating to a live event. The one or more processors may generate a graphical user interface. The graphical user interface may include a first interactive element. The first interactive element may include at least a subset of the list of wager parameters, a second interactive element corresponding to a first outcome of the wager, and a third interactive element corresponding to a second outcome of the wager. The one or more processors may receive a first interaction with the first interactive element to select a first wager parameter from the list of wager parameters. The one or more processors may dynamically update the second interactive element and the third interactive element to include updated first odds for the first outcome and updated second odds for the second outcome, respectively. The updated first odds and the updated second odds may be generated based on the first wager parameter. The one or more processors may update a second graphical user interface to indicate the wager identifying the first outcome or the second outcome in response to a second interaction with the second interactive element or the third interactive element, respectively.

In some implementations, the one or more processors may identify the list of wager parameters by receiving the list of wager parameters form one or more servers. In some implementations, the one or more processors may identify the list of wager parameters by selecting the list of wager parameters based on an event type of the live event.

In some implementations, the first interactive element may include a slider bar. The slider bar may display the subset of the list of wager parameters. In some implementations, the slider bar can be a bidirectional slider bar that may enable selection of the first wager parameter via a bidirectional swipe interaction. In some implementations the one or more processors may update the first interactive element to indicate the first wager parameter as being selected via the first interaction.

In some implementations, the first interaction may include a tap interaction, a click interaction, or a swipe interaction. In some implementations, the first interaction may be the swipe interaction corresponding to causing the first graphical element to present a series of the list of wager parameters in order.

In some implementations, the one or more processors may maintain a data structure. The data structure may store odds for each wager parameter of the list of wager parameters. The one or more processors may populate the graphical user interface using the data structure.

In some implementations, the one or more processors may receive an update to respective odds values associated with the first wager parameter. The one or more processors may update the second interactive element and the third interactive element to indicate the respective odds values associated with the first wager parameter.

In some implementations, the second graphical user interface may display a bet slip. The one or more processors may update the bet slip to indicate the wager. In some implementations, updates to the second interactive element and the third interactive element may be synchronized. Updates to the second interactive elements may be responsive to the first interaction with the first in interactive element.

At least one aspect of the present disclosure is directed to a method. The method can include identifying a list of wager parameters for a wager relating to a live event. The method can include generating a graphical user interface. The graphical user interface may include a first interactive element. The first interactive element may include at least a subset of the list of wager parameters, a second interactive element corresponding to a first outcome of the wager, and a third interactive element corresponding to a second outcome of the wager. The method can include receiving a first interaction with the first interactive element to select a first wager parameter from the list of wager parameters. The method can include dynamically updating the second interactive element and the third interactive element to include updated first odds for the first outcome and updated second odds for the second outcome, respectively. The updated first odds and the updated second odds may be generated based on the first wager parameter. The method can include updating a second graphical user interface to indicate the wager identifying the first outcome or the second outcome in response to a second interaction with the second interactive element or the third interactive element, respectively.

The method can include identifying the list of wager parameters by receiving the list of wager parameters from one or more servers. In some implementations, the method can include identifying the list of wager parameters by selecting the list of wager parameters based on an event type of the live event.

In some implementations, the first interactive element may include a slider bar. The slider bar may display the subset of the list of wager parameters. In some implementations, the first interaction may include a tap interaction, a click interaction, or a swipe interaction.

In some implementations, the method can include receiving an update to respective odds values associated with the first wager parameter. The method can include updating the second interactive element and the third interactive element to indicate the respective odds values associated with the first wager parameter.

In some implementations, the second graphical user interface may display a bet slip. The method can include updating the bet slip to indicate the wager. In some implementations, updates to the second interactive element and the third interactive element may be synchronized. Updates to the second interactive elements may be responsive to the first interaction with the first in interactive element.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which may be carried on appropriate carrier media (e.g., computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of "a", "an", and "the" include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Below are detailed descriptions of various concepts related to, and implementations of, techniques, approaches, methods, apparatuses, and systems for providing graphical user interfaces for participation in wager relating to live events. The various concepts introduced above and discussed in greater detail below may be implemented in any of numerous ways, as the described concepts are not limited to any particular manner of implementation. Examples of specific implementations and applications are provided primarily for illustrative purposes.

The techniques described herein include features and functionalities to generate graphical user interfaces for players wagering on live events. These features may include but are not limited to display mechanics, visual and audio elements, intuitive user interfaces, dynamic game environments, and wager systems. The techniques can be applied to various live events such as racing, football, chess, basketball, baseball, golf, hockey, award shows, games shows, among others. Moreover, the techniques discussed herein allow for the dynamic updating of odds related to live events based on player selection to allow players to engage in informed wagering within a rapidly-changing statistical atmosphere. As used herein, the term "live event(s)" can refer to both events that are currently live (e.g., concurrently occurring in connection with the techniques described herein), or live events that are to occur in the future (e.g., at a scheduled time, such as wagering on an upcoming sporting event). As such, the techniques described herein are applicable to any type of current or future live event.

Figure 1:
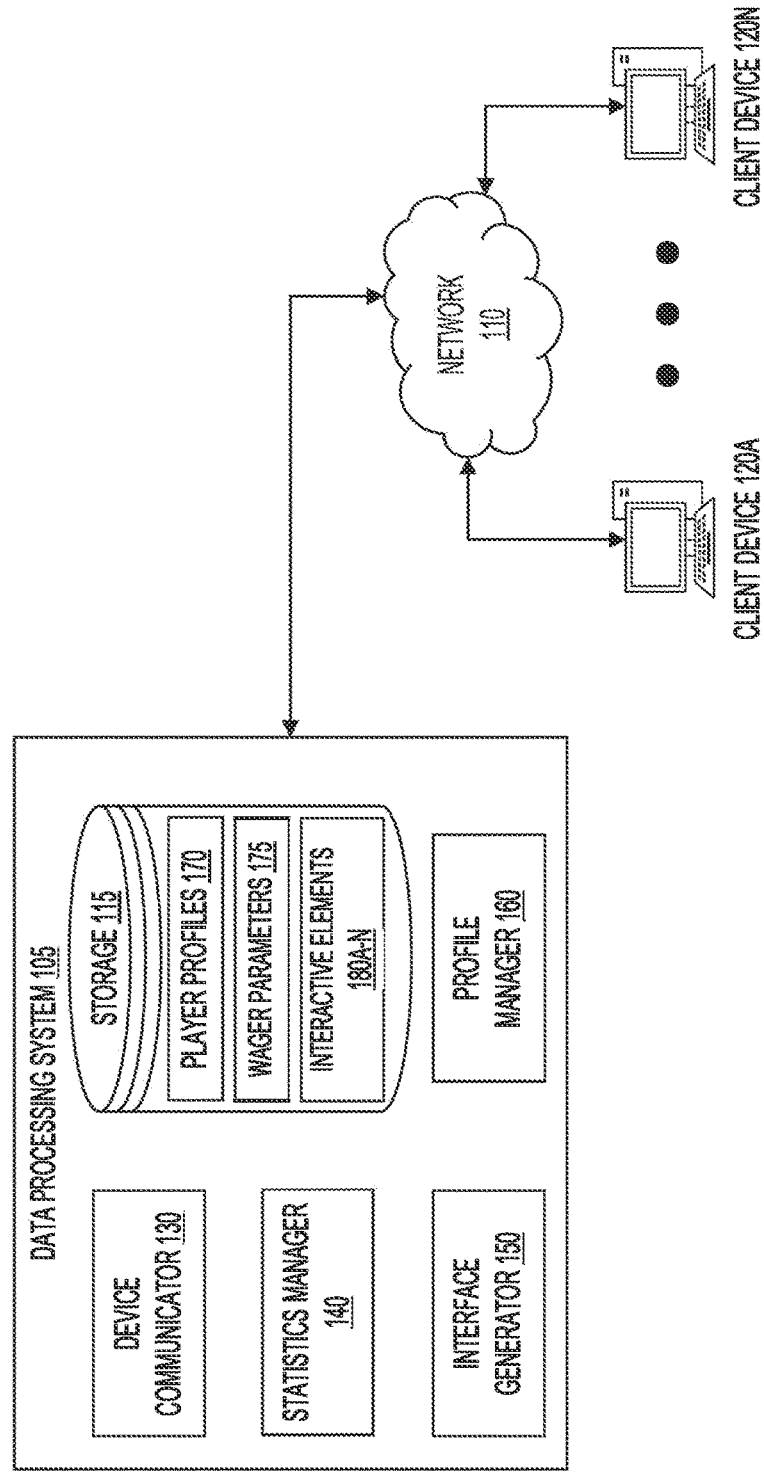
FIG. 1 illustrates a block diagram of an example system for providing graphical user interfaces for participation in wagers relating to live events in a client-server configuration, in accordance with one or more implementations.

Referring to FIG. 1, depicted is a block diagram of an example system 100 for providing graphical user interfaces for participation in wagers relating to live events. In FIG. 1, the system 100 can include at least one data processing system 105, at least one network 110, and one or more client devices 120A-120N (sometimes generally referred to as client device(s) 120).

In FIG. 1, the data processing system 105 can include at least one device communicator 130, at least one statistics manager 140, at least one interface generator 150, at least one profile manager 160, and at least one storage 115. The storage 115 can include one or more player profiles 170, one or more wager parameters 175, and one or more interactive elements 180A-N (sometimes generally referred to as the interactive elements 180). Each of the components (e.g., the data processing system 105, the network 110, the client devices 120, etc.) of the system 100 can be implemented using the hardware components or a combination of software with the hardware components of a computing system, such as the server 400 or the client computing system 414 described in connection with FIG. 4, or any other computing system described herein.

The data processing system 105 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein. The data processing system 105 can include any or all of the components and perform any or all of the functions of a server system 400 described herein in conjunction with FIG. 4.

The network 110 can include computer networks such as the Internet, local, wide, metro or other area networks, intranets, satellite networks, other computer networks such as voice or data mobile phone communication networks, and combinations thereof. The data processing system 105 of the system 100 can communicate via the network 110, for example with one or more client devices 120. The network 110 may be any form of computer network that can relay information between the data processing system 105, the one or more client devices 120, and one or more information sources, such as web servers or external databases, amongst others. In some implementations, the network 110 may include the Internet and/or other types of data networks, such as a local area network (LAN), a wide area network (WAN), a cellular network, a satellite network, or other types of data networks.

The network 110 may also include any number of computing devices (e.g., computers, servers, routers, network switches, etc.) that are configured to receive and/or transmit data within the network 110. The network 110 may further include any number of hardwired and/or wireless connections. Any or all of the computing devices described herein (e.g., the data processing system 105, the one or more client devices 120, the server system 400, the client computing system 414, etc.) may communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the data processing system 105, the one or more client devices 120, the server system 400, the client computing system 414, etc.) may also communicate wirelessly with the computing devices of the network 110 via a proxy device (e.g., a router, network switch, or gateway).

Each of the client devices 120 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 120 can include one or more computing devices or servers that can perform various functions as described herein. The one or more client devices 120 can include any or all of the components and perform any or all of the functions of the client computing system 414 described herein in conjunction with FIG. 4.

Each client device 120 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 120 can be implemented using hardware or a combination of software and hardware. Each client device 120 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display multiple interactive elements as described herein. The display can include a touch screen displaying an application, such as the wagering applications described herein. The display can include a border region (e.g., side border, top border, bottom border).

Figure 2A:
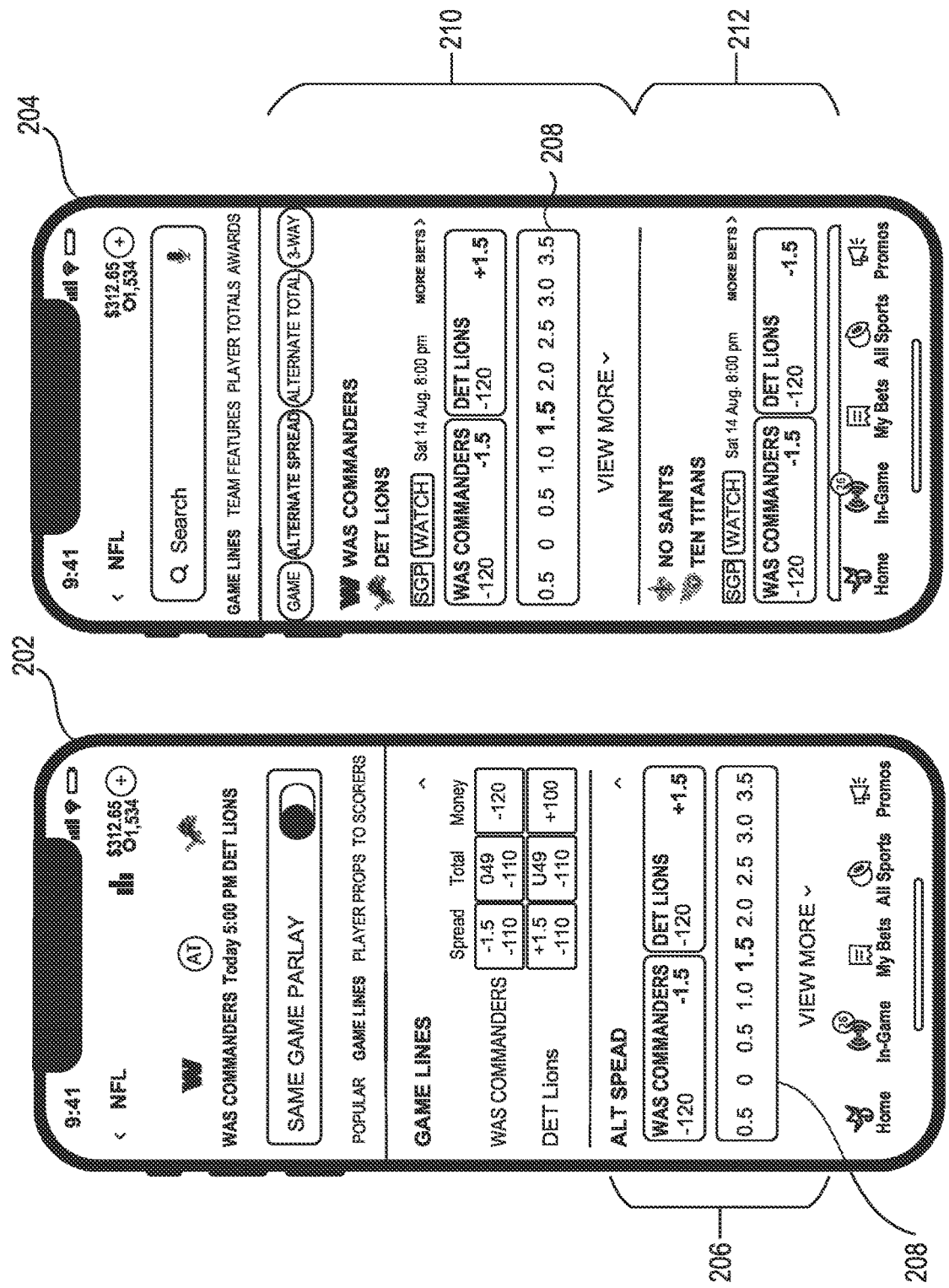
FIG. 2A illustrates a graphical user interface for a live event wager, in accordance with one or more implementations.
Figure 2B:
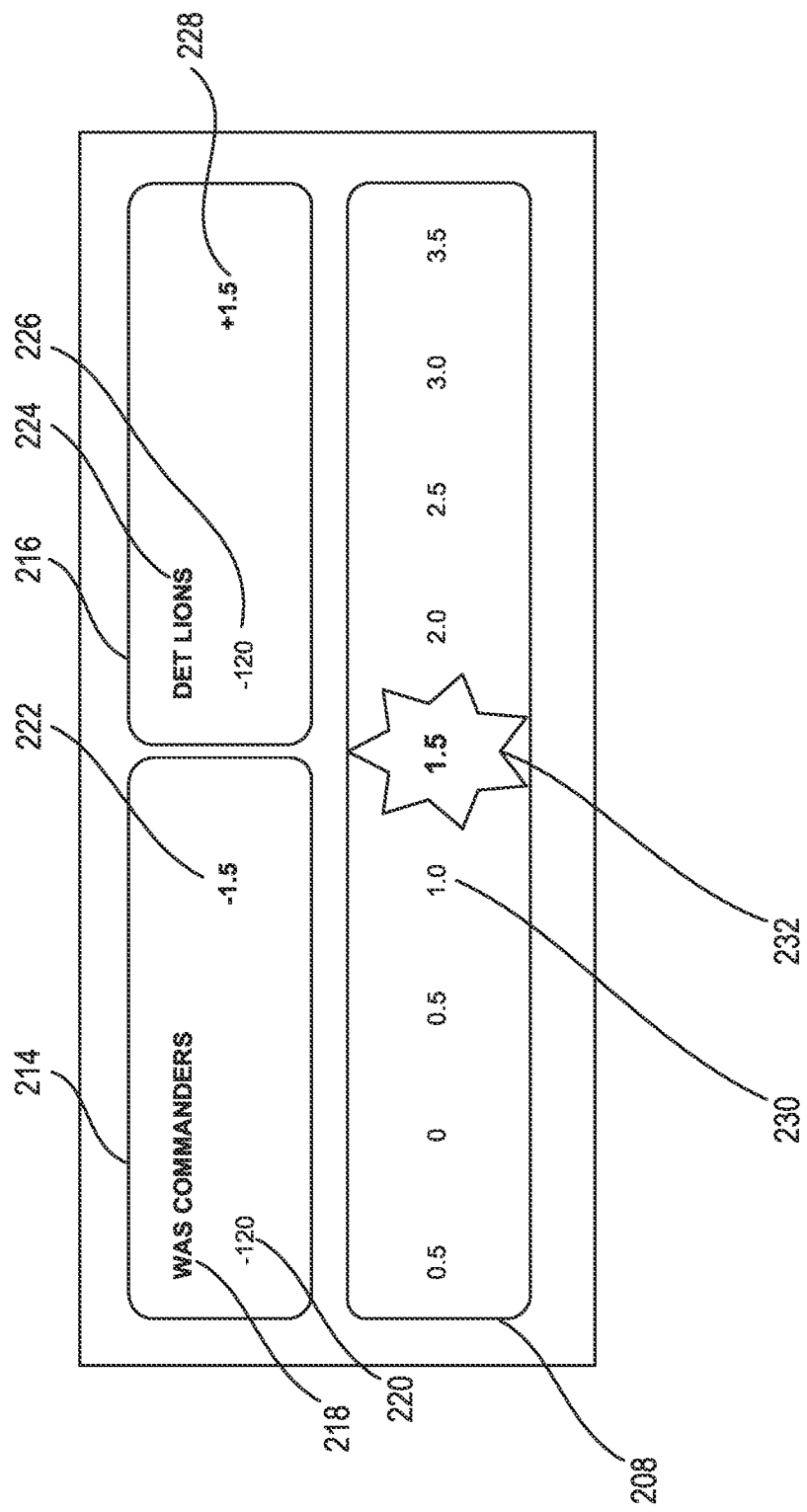
FIG. 2B illustrates a graphical user interface showing a slider bar, in accordance with one or more implementations.
Figure 2C:
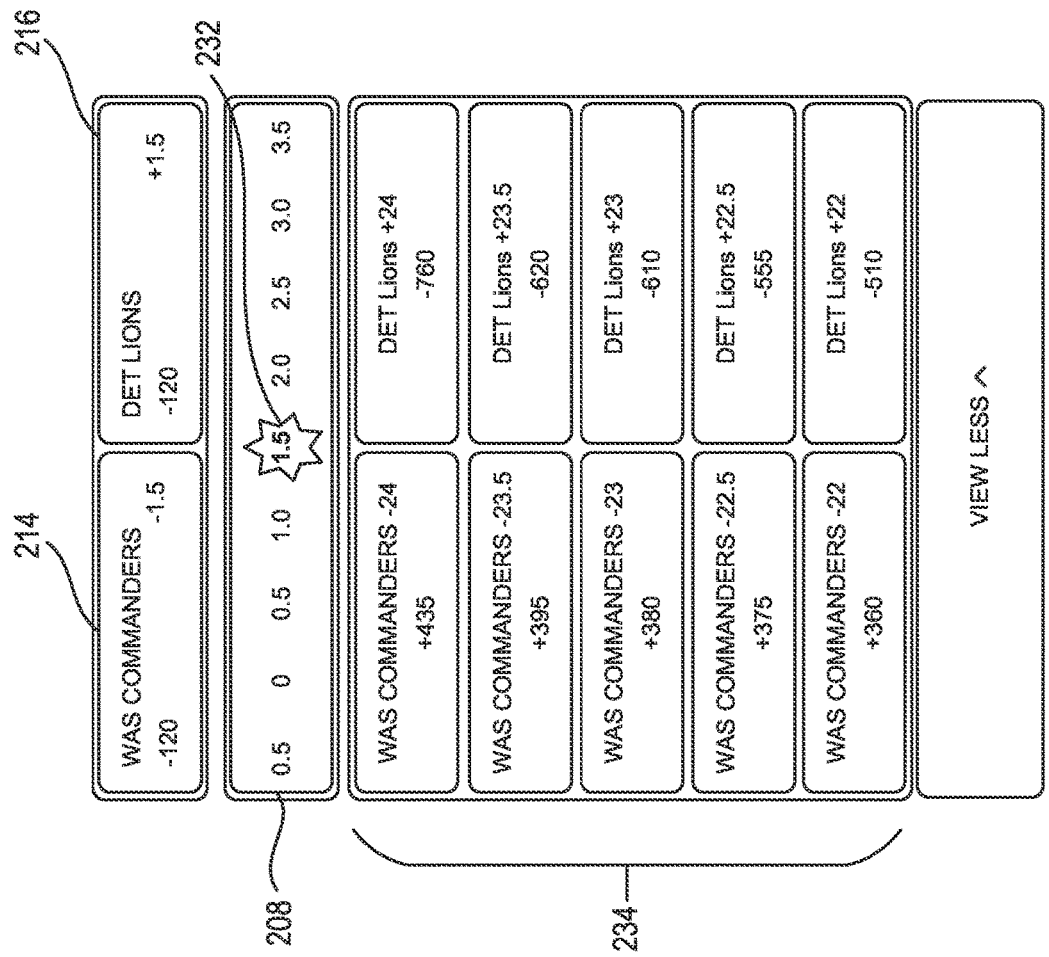
FIG. 2C illustrates a graphical user interface showing a listing of live events with corresponding outcomes.

In some implementations, the display can include a touch screen display, which can receive interactions from a player. Touchscreens are becoming increasingly popular as they offer a more intuitive way to interact with devices. Touchscreens may include displays that present graphical user interfaces, which may include icons, buttons, and other graphical elements that can be interacted with by touching the screen. For example, as shown in FIGS. 2A-2C, the graphical user interface can display game graphics, interactive objects, and other relevant information that players need to interact with the data processing system 105.

The interactions can result in interaction data, which can be stored and transmitted by the processing circuitry of the client device 120. The interaction data can include, for example, interaction coordinates, an interaction type (e.g., click, swipe, scroll, tap, etc.), and an indication of an actionable object with which the interaction occurred. Each client device 120 can include an input device that enables a player to interact with and/or select one or more actionable objects as described herein. For example, a touchscreen display can enable interaction with one or more visual indications provided through the display of each mobile device 120, and responsive to an interaction (e.g., select, click-on, touch, hover), the client device 120 can generate an indication identifying a player input and/or selection of a wager, a live event, or a spread value, among others.

Each client device 120 can include a device identifier, which can be specific to each respective client device 120. The device identifier can include a script, code, label, or marker that identifies a particular client device 120. In some implementations, the device identifier can include a string or plurality of numbers, letters, characters or any combination numbers, letters, and characters. In some implementations, each client device 120 can have a unique device identifier. Each client device 120 can include a client application, which can be a wager application that communicates with the data processing system 105 to place wagers, as described herein. The client application can include an application executing on each client device 120 or provided to the client device 120 by the system.

The application can include a web application, a server application, a resource, a desktop, or a file. In some implementations, the application can include a local application (e.g., local to a client device 120), hosted application, Software as a Service (SaaS) application, virtual application, mobile application, and other forms of content. In some implementations, the application can include or correspond to applications provided by remote servers or third-party servers. In some implementations, the application can access the player profiles 170, the wager parameters 175, or the interactive elements 180, stored and maintained at the storage 115, and generate one or more user interfaces, such as the user interfaces described herein below in connection with FIGS. 2A-2C, to a player through a client device 120.

Such user interfaces can include player-selectable hyperlinks, buttons, graphics, videos, images, or other application features that generate a signal that is processed by the application executing on the respective client device 120.

In implementations, one or more client devices 120 can establish one or more communication sessions with the data processing system 105. The one or more communication sessions can each include a channel or connection between the data processing system 105 and the one or more client devices 120. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic. The client devices 120 can each use the communication session established with the data processing system 105 to carry out any of the functionalities described herein. For example, the application executing on a client device 120 can perform any of the client-side operations described herein, including displaying any of the user interfaces shown in FIGS. 2A-2C, or any other types of user interfaces described herein.

Each of the client devices 120 can be computing devices configured to communicate via the network 110 to access information resources, such as web pages via a web browser, or application resources via a native application executing on a client device 120. When accessing information resources, the client device can execute instructions (e.g., embedded in the native applications, in the information resources, etc.) that cause the client devices to display wager application interfaces, such as the user interface described herein below in conjunction with FIGS. 2A-2C. The wager application interfaces can be, for example, application interfaces that present different types of odds, wager parameters 175, or outcomes associated with one or more lives events. In general, live event wagering applications include content (e.g., images, video, animations, graphics, audio, etc.) that is presented to a player via the input/output interfaces of a client device 120.

In response to interaction with user interface elements, the client devices 120 can transmit information, such as player profile information (e.g., changing player profile parameters, changing login information, any information stored in a player profile 170, etc.), interaction information, selections of wager amounts, selections of wagering participation events, or other signals to the data processing system 105. In some implementations, a client device 120 can transmit a request to initiate a wagering session, and requests for additional wagering features during a wagering session. The request can include, for example, a request to wager on a particular live event (e.g., can include a wager identifier, etc.). The request can be a hypertext transfer protocol (HTTP or HTTPS) request message, a file transfer protocol message, an email message, a text message, or any other type of message that can be transmitted via the network 110.

The data processing system 105 is shown as including the storage 115. The storage 115 can be a computer-readable memory that can store or maintain any of the information described herein. The storage 115 can maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. The storage 115 can be accessed by the components of the data processing system 105, or any other computing device described herein, via the network 110. In some implementations, the storage 115 can be internal to the data processing system 105. In some implementations, the storage 115 can exist external to the data processing system 105 and may be accessed via the network 110. For example, the storage 115 may be distributed across many different computer systems (e.g., a cloud computing system) or storage elements and may be accessed via the network 110 or a suitable computer bus interface.

The data processing system 105 can store, in one or more regions of the memory of the data processing system 105, or in the storage 115, the results of any or all computations, determinations, selections, identifications, generations, constructions, or calculations in one or more data structures indexed or identified with appropriate values. Any or all values stored in the storage 115 may be accessed by any computing device described herein, such as the data processing system 105, to perform any of the functionalities or functions described herein. In implementations where the storage 115 forms a part of a cloud computing system, the storage 115 can be a distributed storage medium in a cloud computing system and can be accessed by any of the components of the data processing system 105, by the one or more client devices 120 (e.g., via the user interface similar to that depicted in FIGS. 2A-2C, etc.), or any other computing devices described herein.

The storage 115 can store one or more player profiles 170 associated with a user (referred to herein as a "player") of a client device 120. A player profile 170 of a player can be a user profile that includes information about the player and information about one or more of the client devices 120 used to access the data processing system 105 using the player profile 170. For example, identifiers of the player profile 170 can be used to access the functionality of the data processing system 105 (e.g., by logging into the data processing system 105 via one or more web-based interfaces). The identifiers can include a username, a password, an e-mail address, a phone number, a personal identification number (PIN), a secret code-word, device identifiers for use in a two-factor authentication technique, among others. The player profile 170 can store information about wagers, live events, and selections that are performed by the player via the data processing system 105. The player profile 170 can store a credit balance, wager information or side wager information (e.g., an amount of a wager/side wager, a timestamp associated with a wager/side wager, information about gaming conditions or game state information that resulted in a side wager, a client device identifier of a client device that was used to place the wager/side wager, etc.). The player profile 170 can store information about a client device used to access the data processing system 105 such as an IP address, a MAC address, a GUID, a player profile name (e.g., the name of a user of the client device 120, etc.), device name, among others. In some implementations, the player profile 170 can be created by the data processing system 105 in response to the player profile creation request transmitted by a client device 120. The player profile creation request can include any of the player profile information described herein.

The storage 115 can store or maintain wager parameters 175 associated with each of the one or more player profiles 170, for example, in one or more data structures. The wager parameters 175 can include information for a wager related to a live event to occur or currently occurring or otherwise accessed by a client device 120 using a corresponding player profile 170. In some implementations, a client device 120 accessing the data processing system 105 may not be associated with a player profile 170. In such implementations, the data processing system 105 can automatically create a player profile 170 using an identifier of the client device 120 provided by the client device 120.

The wager parameters 175 can be a set of values, numbers, or other such indicators that relay information about odds, outcomes, wagers, or other data provided by the client device 120 during a wager for a live event provided by the data processing system 105. As described in further detail herein, the statistics manager 140 can identify a list of wager parameters 175. The statistics manager 140 can maintain (e.g., store, update, etc.), in corresponding wager parameters 175, a respective odds for each wager parameter of the list of wager parameters 175. The wager parameters 175 can include one or more data structures that include any information related to the odds, such as an outcome of a live event, statistics relating to the live event, or other odds information described herein. The wager parameters 175 can correspond to any type odds for any type of wager, such as a point spread/handicap wager, a three-way spread/handicap wager; a money line wager; a total points wager (e.g., an over or under target point value for the wager), goals, or runs; odd/even; period wagers; decisive goal; and variations of the aforementioned; among others. The wager parameters 175 can include any set of threshold values for a particular wager type. For example, the wager parameters 175 may include a list of spread values for a two-way spread wager or a three-way, a list of total points for a total point wager, or any other threshold value (or set of threshold values for any type of wager). A player can interact with the client device 120 to select one or more wager parameters from the list of wager parameters 175 in relation to a wager on the live event.

The wager parameters 175 can include or be based on live event information (e.g., current statistics associated with the live event, players participating in the live event, scores of the live event, etc.) for one or more wagers provided via the data processing system 105. In some implementations, information used to update the wager parameters 175 can be received as the live event occurs or prior to the occurrence of the live event (e.g., as the live event or events related to the live event are processed by the data processing system 105). For example, the odds for a particular wager parameter 175 may be updated responsive to a change in the live event (e.g., an athlete injury, a goal scored, an athlete substitution, etc.). The odds for a particular wager parameter 175 may be established by the system 100, an external system, or a combination thereof. In some cases, the system 100, an external system, or a combination thereof can determine the odds using data from one or more live events. Odds for a particular wager parameter 175 may be determined, calculated, or otherwise established by statistical analyses performed on historical data relating to a type of the live event, an athlete of the live event, historical odds of the live event, among others. In some cases, the system 100 can determine the odds for one or more of the wager parameters 175 (e.g., odds associated with a threshold for a particular wager type, etc.) using data from one or more other wager parameters 175, player profiles 170, or odds for similar live events or wager parameters 175.

The wager parameters 175 can include threshold values (spread values) for a spread wager (e.g., a two-way or three-way spread wager/handicap wager). The spread values can refer to or relate to a threshold number of points, goals, scores, runs, among other denominations, between two or more competing teams, players, or fantasy sports lineup entrants at the completion of a live event or period of time within the live event (e.g., at halftime or the end of a quarter or period). The spread values can correspond to a two-way spread wager, a three-way spread wager, or other type of wager market. In some implementations, the spread values corresponding to a two-way market can relate to a number of points that a team or player would finish the game with over an opponent. The spread values can include or be referred to as a puck line (e.g., as in hockey), a run line (e.g., as in baseball), or handicap, among others. In some implementations, placing a wager including the two-way spread values can include a selection of a "favorite" (e.g., likely team to win the live event) and an "underdog" (e.g., unlikely team to win to the live event) based on the wager parameters 175. For example, a spread value of −6 associated with the Oklahoma City Thunder in a basketball game of the Thunder vs. the Denver Nuggets can indicate an outcome of the basketball game in which the Thunder wins by at least 6 points over the Nuggets.

In this example, the Thunder can be referred to as the "favorite" and the Nuggets can be referred to as the "underdog." Further to this example, the spread value of −6 associated with the Thunder can include or imply a spread value of +6 associated with the Nuggets, indicating an outcome where the Nuggets lose by at least 6 points to the Thunder. In this example, a player placing a wager implementing these spread values for the basketball game can select the outcome favoring the Thunder to win as a part of the wager (e.g., selecting the favorite to win). In this illustrative example, the player would consequentially win the wager if the Thunder wins the basketball game by at least 6 points. Conversely, the player placing the wager implementing these spread values can select the outcome favoring the Nuggets to win (e.g., selecting the underdog to win). In this case, the player would win the wager if the Nuggets lose by less than 6 points or win outright against the Thunder.

To surmise, in a two-way point spread market, two possible outcomes can exist: a first team winning by a particular amount of points (e.g., the spread value) or the first team not winning by the particular amount of points. As an illustrative example, in a three-way point spread market, there can exist three possible outcomes: the first team winning by a particular amount of points, the first team tying with a second team, or the first team losing (e.g., not winning by the particular amount of points and not tying with the second team). In this illustrative example of a three-way point spread market, the player may select any of the three possible outcomes and will win if the outcome is satisfied by the live event.

The wager parameters 175 can correspond to a money line market. A money line market can refer to a two-way market based on the outcome of the live event involving two competing teams. In some cases, the money line can be inclusive of overtime during the live event. The money line can include two outcomes: a first team as a winner or a second team as a winner. In some cases, a money line market wage can be placed only for live events in which no tie is possible, such as a hockey game including shoot-outs or a tennis match.

The wager parameters 175 can correspond to a total points, goals, or runs market. The total points, goals, or runs market can include a two-way market based on the total number of occurrences scored in the live event among the competitors. The occurrences can include points, goals, scores, corners, rebounds, among other discrete occurrences within a live event. For example, if a first team scores 5 points and a second team scores 2 points, the total points scored in the live event would be the sum of 5 and 2 (e.g., 7). For a total points, goals, or runs market, the player can select a wager parameter corresponding to a total number of points for the live event. The outcomes of a total points market wager can include two outcomes corresponding to being either "over" (e.g., exceeding) or "under" (e.g., less than) the selected wager parameter indicating the total number of points. In some cases, the total number of points at the end of the live event or betting period of the live event (e.g., half or quarter) can equal the selected wager parameter. In this event, the wager can be a loss or can be declared void.

The wager parameters 175 can correspond to an odd/even market. An odd/even market can include a wager parameter selected by the player in which an amount of an occurrence of the live event (as described herein) is selected as odd or even. For example, a total number of points can have a selected wager parameter of odd, in which the player can win the wager if the total number of points at the conclusion of the live event is an odd number (e.g., 1, 3, 5, etc.).

The wager parameters 175 can correspond to a period market. A period market can refer to or include a wager parameter selected for an outcome occurring at a defined time of the live event. A defined time of the live event can include a half time, quarter, period, inning, conclusion of the live event, among others. In some cases, the wager parameter for a period market can correspond to the total number of occurrences accumulated during a particular defined time of the live event. The period market can correspond to only the occurrences during the defined time of the live event, or to the aggregated occurrences prior to and including the defined time of the live event.

The wager parameters 175 can correspond to a decisive goal market. A decisive goal market can include a wager parameter corresponding to a winning goal, point, score, or other occurrence. In some cases, the wager parameter can correspond to an athlete or team making the winning or final occurrence of the live event. For example, the wager parameter can include a selection of an athlete who scores the winning goal of a soccer match. In some case, occurrences scored in a regular or overtime period of the live event may be included in the outcome but penalty or foul goals may not be included.

The wager parameters 175 can correspond to a win/place market. A win/place market can correspond to a wager including two wager parameters. The two wager parameters can include a win part and a place part. The win part can include a selection of a team of a live event to win the live event. The place part can include a selection to finish either first or within the live event's specified place terms (e.g. 2nd, 3rd, 4th, etc.). Each live event corresponding to a win/place market may have place terms depending on the number of participants of the wager, e.g. $\sqrt{1/4}$ 1-2-3. In this example, a selection that finishes 1st will have two unrelated outcomes: an outcome related to the winning team and an outcome related to a place of the team in an overall standing. For example, for a swim meet, a player may select a swimmer of a first swim team to be second place in a particular swim race of the swim meet (e.g., 100 m backstroke of a swim meet including multiple other swim races) and the player may select the first swim team as the overall winner of the swim meet.

In some cases, a live event can correspond to one or more market or can accept selections for one or more markets by the player. For example, a player can select a wager associated with a period market and a wager associated with a win/place market for the same live event. The player can select, view, or otherwise interact with the wager parameters 175 via one or more interactive elements 180.

The storage 115 can store or maintain interactive elements 180. The interactive elements 180 can include one or more interactive elements displaying through a graphical user interface, such as the graphical user interfaces of FIGS. 2A-2C. The interactive elements 180 can include one or more user interface elements to accept input or display output via the client device 120. For example, the interactive elements 180 can include one or more buttons, switches, toggles, sliders, text boxes, drop down menus, or other such user interface elements, such as those described in reference to the user input 422 of FIG. 4 at least. In some implementations, the interactive elements 180 may include executable instructions, interpretable scripts, or commands that cause a client device 120 to generate and display interactive user interface elements, as described herein.

The interactive elements 180 can include a first interactive element 180A that includes a subset of the list of wager parameters 175. A graphical user interface can present the subset of the wager parameters 175. In some implementations, the first interactive element 180A can be or include a slider bar. The slider bar can be an interactive element to display a selected subset of wager parameters 175 (e.g., corresponding to a potential wager, etc.) and to accept input of a selection of one or more wager parameters 175 through a graphical user interface presenting on a display device of the client device 120. For example, the slider bar can display a subset of the wager parameters 175 for a player to interact with via, for example, a touch screen displaying a user interface including the slider bar.

The first interactive element 180A can accept input to select one or more wager parameters of the subset of the wager parameters 175. The slider bar including the subset of the wager parameters can display the subset of wager parameters 175. In some implementations, the slider bar can present the subset of wager parameters in a sequential order or pattern, such as incrementing or decrementing by a set number. For example, the slider bar may present a discrete set of wager parameters 175 in an order such as "−1, −0.5, 0, 0.5, 1" or the slider bar may present a set of wager parameters 175 in an order such as "1, 2, 3, 4, 5, 6." These examples are meant to be non-limiting, as the subset of the wager parameters 175 can include any number of wager parameters arranged in any order. Further, the set of wager parameters 175 may be selected to correspond to any type of wager.

In some implementations, the slider bar can present the subset of the wager parameters 175 and can change the subset of the wager parameters 175 displayed. For example, the slider bar can accept input via a graphical user interface to change the display of the slider bar including the subset of values. In some implementations, a player can swipe, slide, click, or otherwise interact with the slider bar to present a different subset of the wager parameters 175. For example, the player can be presented with a first subset of the wager parameters 175 as "−2, −1, 0." In this illustrative example, the player may swipe (by interacting with) the slider bar to the left. The slider bar may then present a second subset of the wager parameters, such as "0, 1, 2."

The first interactive element 180A can accept input based on the subset of wager parameters 175. For example, a user can interact with the slider bar to select at least one of the wager parameters from the subset of wager parameters 175 presented by the user interface. In some implementations, a player can interact with the slider bar to select the at least one wager parameter via a tap interaction, a click interaction, or a swipe interaction. A tap interaction can refer to or include an interaction with a touch screen to supply player input, such as tapping a button or a value of the slider bar. A click interaction can refer to or include an interaction to supply player input in which the player actuates a periphery device, such as a mouse or keyboard, to provide the input. A swipe interaction can refer to or include an interaction in which the player presses (via a touch screen periphery device, or other such user input device) an interactive element 180 and drags or pulls the element to effect a selection or change in the presentation of the interactive element 180.

In some implementations, the slider bar of the first interactive element 180A can be or include a bidirectional slider bar. The bidirectional slider bar (or simply, the slider bar) can enable selection of a wager parameter through a bidirectional swipe interaction. A bidirectional swipe interaction can be a swipe interaction (as described herein) which operates in two directions. As an illustrative example of an interaction with the bidirectional slider bar, the wager parameters 175 can include a first subset of wager parameters, a second subset of wager parameters, and a third subset of wager parameters. In this example, the first subset of wager parameters may overlap in part with the second subset of the wager parameters or may overlap in part with the third subset of the wager parameters. The first, second, and third subset of the wager parameters may be arranged in an order, such as an order of incrementing or decrementing numbers. For example, the third subset may include the wager parameters "−3, −2, −1," the first subset may include the wager parameters "−1, 0, 1," and the second subset may include the wager parameters "1, 2, 3." Continuing with the illustrative example, the first interactive element 180A may display the slider bar with the first subset of values. The player may swipe the slider bar to the left to cause the first interactive element 180A to display the second subset of the wager parameters 175. The player may subsequently swipe the slider bar to the right. Swiping the bidirectional slider bar to the right may cause the first interactive element 180A to display the first subset of the wager parameters 175, or the third subset of the wager parameters 175. In some implementations, the force, acceleration, direction, or duration with which the player interacts with the slider bar can cause different subset s of the wager parameters 175 to display on the graphical user interface via the first interactive element 180A.

In some implementations, the first interactive element 180A can indicate a selected wager parameter 175. The first interactive element 180A can indicate the selected wager parameter by providing visual, auditory, or haptic feedback to a player upon a selection of the wager parameter 175 from the subset of wager parameters 175. For example, the player may tap a wager parameter displayed within the slider bar to select the wager parameter 175. The first interactive element 180A may actuate a vibration, buzz, or other haptic feedback through the client device 120 to indicate selection of the wager parameter to the player. The player may be provided with a visual indication of the selection of the wager parameter. For example, upon selecting or concurrent with selecting a wager parameter 175 from the subset of wager parameters 175 presenting on a first graphical user interface, the first graphical user interface may present a visual cue indicating the selection of the wager parameter 175. The visual cue can include a highlight, color change, animation, circle, star, boldening, or other visual change in the presentation of the wager parameters 175 to distinguish the selected wager parameter 175 from the other wager parameters presenting through the first graphical user interface. In some implementations, the selected wager parameter 175 can be indicated auditorily, such as by a noise, sound, pitch, or other such audio emitted by the client device 120 in response to the selection of the wager parameter 175. For example, upon or concurrent with the selection of the wager parameter 175, the client device 120 may receive instructions to indicate the selection of the wager parameter 175 by beeping, pinging, playing music, or another such audio cue.

The interactive elements 180 can include options that a player may take at each portion of a wager, and any actions (e.g., interactions, pausing/waiting for a particular duration at stored timestamps, etc.) the client device 120 takes in response to said options. In some implementations, the interactive elements or their corresponding components (e.g., the slider bar, the subset of the wager parameters 175 or the odds contained within the data structure of each wager parameter) can change responsive to a change in the live event, an option taken by a player, or an action by the client device 120. In addition, the wager parameters 175 can include information relating to the conditions of additional wagers.

In some implementations, the interactive elements 180 can include a player's selected wager parameter of the subset of wager parameters 175 and the corresponding odds associated with the selected wager parameter. Additionally, the interactive elements 180 can include data indicating whether an outcome associated with an interactive element (e.g., the second interactive element 180B or the third interactive element 180C) corresponds to the player-selected wager parameter 175 (as indicated in the first interactive element 180A). For example, the interactive elements 180 can also include data indicating if the selected wager parameter 175 and an associated team with the wager parameter is above, below, or equal to the outcomes, specifying the win or loss of the bet.

The interactive elements 180 can include, or may include instructions for generating, odds information, which can be stored within a data structure of the wager parameters 175 as probability values of certain events occurring during a live event. The odds information may further define one or more probability distributions that may be sampled to determine an outcome of one or more events in the live event. In some implementations, the odds information may be altered based on actions taken by the player, or the odds information can correspond to the likelihood of one or more outcomes (e.g., an expected value of player loss, an expected value of player win, etc.). For example, in a live football game, the odds of an athlete reaching the 50 yard line within a period of time may determine how much money the player wins if that event occurs.

In some implementations, the odds information may be used to determine the likelihood of one or more particular outcomes. For example, the odds information for a football game may indicate the likelihood that the Buffalo Bills win the game over the New England Patriots. In this manner, the outcomes can include odds information. In some implementations, the odds information can relate to the wager parameters 175. Each wager parameter can include odds information relating to the likelihood of the favorite winning for that wager parameter and the underdog losing for that wager parameter. Conversely, the wager parameter can include odds information relating to the likelihood of the underdog winning for a wager parameter or the favorite losing for the wager parameter. A selected wager parameter 175 may indicate a particular outcome for a live event and the odds information may be generated based on the selected wager parameter 175. For example, the wager parameters 175 can indicate a point spread of a live event. The player can select an outcome corresponding to the odds values indicated in the wager parameters 175. For example, a first wager parameter of −5 can represent the outcome that the Buffalo Bills win by or more points over their opponents, the New England Patriots. The wager parameter of −5 can include associated odds information of how likely it is for the Buffalo Bills to win over the New England Patriots by 5 or more points. As another example, a first wager parameter of −1.5 can include first odds that the New York Rangers win a hockey game against their opponents, the New Jersey Devils, by 2 goals. A second wager parameter of −2.5 can include second odds different than the first odds that the Rangers win the hockey game against the Devils.

The interactive elements 180 can include a second and third interactive element, 180B and 180C, respectively, that correspond to the outcomes of a wager. In some implementations, the first interactive element 180B can correspond to a first outcome of the wager and a third interactive element 180C can correspond to a second outcome of the wager. The outcome of the wager can be or include a final score of a live event, a statistic related to a live event, a winnings or award associated with the wager on a live event, among others. For example, the first outcome can include a score associated with a first team participating in the live event and the second outcome can include a score associated with a second team participating in the live event. As another example, the first outcome can include a Walks and Hits Per Inning Pitched (WHIP) for a first starting pitcher of a live baseball game and a WHIP for a second starting pitcher of the live baseball game.

In some implementations, the second and third interactive elements 180B and 180C can include information related to the live event, such as a team name, athlete name, overall standing of a team, current score of the live event, current statistics of the live event, outcomes of prior live events associated with a team or player of the current live event, a favorite or underdog of the live event, among others. The second and third interactive elements 180B and 180C may display the information related to the live event, such as displaying a graphical user interface including a team of the live event and the team's score during the live event. The information related to the live event can change as the live event progresses. For example, the third interactive element 180C can display an updated score for a team as the live event progresses.

The second and third interactive elements 180B and 180C can include the odds information as related to the live event. For example, the second interactive element 180B or the third interactive element 180C can include information related to a likelihood of a team to win the live event, tie the live event, lose the live event, score a certain number of points, among others. The odds information related to the second or third interactive elements 180B and 180C, respectively, can correspond to the selected wager parameters 175. For example, the selection of a wager parameter 175 can update or generate odds associated with a first outcome of the second interactive element 180B. A subsequent of second selection of a second wager parameter 175 can update or generate different odds for the first outcome of the second interactive element 180B.

In some implementations, the wager parameters 175 can provide instructions for generating graphical user interfaces to facilitate wagering on a live event. In a brief overview of generating graphical user interfaces to facilitate wagering on the live event, the data processing system 105 can identify a list of wager parameters for the wager. The data processing system 105 can cause the presentation of a graphical user interface having a first interactive element including a subset of the wager parameters, a second interactive element including a first outcome of the wager, and a third interactive element corresponding to a second outcome of the wager. A player may select a wager parameter through the first interactive element. The data processing system 105 can update odds associated with the second interactive element and the third interactive element based on the first wager parameter. The data processing system 105 can update a second graphical user interface to indicate the wager.

Referring now to the operations of the data processing system 105, the device communicator 130 can establish a wagering session with a client device (e.g., the client device 120) in response to a request from a client device. Establishing the wagering session may include identifying the wager parameters 175 for the player profile 170 used to access the data processing system 105 to initiate a wager associated with a live event. The request to establish a wagering session may include a request to place a bet, which may be received in one or more messages from an application executing on the client device 120. The message, or request, can indicate that a player intends to participate in a wager provided by the data processing system 105. The message can include an indication of a player profile 170 with which to use for the functionalities related to the game (e.g., placing wagers using earned credits, purchasing additional credits, etc.).

The message can include an identifier of a particular live event. In some implementations, the device communicator 130 can provide the client device 120 with instructions to display one or more live events to bet on in a list, allowing the player to select a live event from the list. In response to an interaction indicating a selection, the client device 120 can transmit a signal identifying a live event wager to the data processing system 105. Using the live event selection, the data processing system 105 can generate a user interface for the wager generated according to the interactive elements 180 for the wager and the wager parameters 175 for the wagering session. Such graphical user interfaces are shown in FIGS. 2A-2C.

The wager can be on a live event such as a baseball game, soccer game, football game, tennis game, golf game, hockey game, mixed martial arts (MMA) match, game show, trivia game, awards show, spelling bee, or any other such event, sports game, match, or competition that has yet to occur or is occurring in real time. The wager can include a selection of a team of the live event and a selection of a wager parameter. The device communicator 130 can receive one or more wagers from the client device 120 (e.g., in response to corresponding user interface elements presented at the client device 120, as described herein). The wager(s) may specify a wager amount. The wager amount provided by the client device 120 can be a specified amount of credits, money, tickets, or other betting denominations. In some implementations, the player can specify a custom number or fractional number of credits used in the game, each of which may correspond to a respective condition, outcome, or aspect of the game. In some implementations, the wagers may include side wagers, additional wagers, or other wagers placed prior to or during a play of the game.

The client device 120 (or an application executing on the client device 120) can receive data relating to the live event wager from the device communicator 130. The data relating to the requested game can include or may be generated based on the wager parameters 175, which can be maintained by the statistics manager 140, as described herein. The device communicator 130 may determine updated information to provide to the client device 120 based on the wager parameters 175 for the game, which is initialized and updated by the statistics manager 140.

The statistics manager 140 can update and maintain the wager parameters 175 and the odds information associated with the wager parameters 175. The statistics manager 140 may identify a list of wager parameters for the wager relating the live event. The statistics manager 140 may identify the list of wager parameters by receiving the list of wager parameters from one or more servers. For example, the statistics manager 140 may receive the wager parameters associated with a live event from an outside computing device, server, or database. The statistics manager 140 may generate the odds for each wager parameter based on the wager parameters. In some implementations, the statistics manager 140 may generate odds for a wager parameter upon a selection of a wager parameter. For example, a player may interact with the first interactive element 180A to select a first wager parameter 175. The statistics manager 140 may update odds for a first outcome associated with the second interactive element 180B and odds for a second outcome associated with the third interactive element 180C based on the selected wager parameter 175. In some implementations, the statistics manager 140 may generate the odds for each wager parameter of the wager parameters 175 upon the identification of the wager parameters 175. The statistics manager 140 can maintain a data structure for each wager parameter 175 to store odds for each wager parameter.

The statistics manager 140 may identify the wager parameters based on an event type of the live event. The live event can include an event type. The event type may correspond to any attribute of a live event, such as a type of event such as sporting (e.g., hockey, football, basketball), game show (e.g., trivia, word-based, physical competition), or awards show (e.g., the Nobel Prize, the Pulitzer Prize, the Tony Awards). The event type may correspond to a duration of a live event (e.g., one hour, three hours), a location of a live event (e.g., events taking place in Spain, Texas, or London), or a team size of the live event (e.g., doubles tennis, a swimming medley relay). The statistics manager 140 may identify the wager parameters based on the event type to identify a range or values of the wager parameters 175. For example, wager parameters associated with an event type of hockey can include wager parameters from −2.5 through 2.5, incrementing by 0.5, whereas wager parameters associated with an event type of football can include wager parameters from −40 through 40, incrementing by 1. These wager parameters and associated event types are provided as examples and are non-limiting. Any event type can include any wager parameters not detailed herein. The statistics manager 140 may determine, based on a live event, the wager parameters from the type of the live event. The statistics manager 140 can update the odds associated with the wager parameters based on several factors, including player interactions, random values, and occurrences within the live event. For example, if a player interacts with the slider bar of the first interactive element 180A, the statistics manager 140 may update the odds associated with the outcomes to reflect that action.

The interface generator 150 can generate, create, or modify graphical user interfaces including the interactive elements 180 to facilitate the wager relating to the live event. In some embodiments, the interface generator 150 can generate a graphical user interface including the first interactive element 180A. The first interactive element 180A can include a slider bar presenting a subset of the wager parameters 175 identified by the statistics manager 140 for the live event. The graphical user interface can include the second interactive element 180B and the third interactive element 180C. The interface generator 150 can generate instructions for the client device 120 to display or update the graphical user interfaces upon a display device of the client device 120. The interface generator 150 can include, in the instructions, positions, functions, sizes, animations, or other attributes associated with the graphical user interfaces and the interactive elements displayed therein.

The interface generator 150 can update the interactive elements 180 displaying on the graphical user interface. The interface generator 150 can update the interactive elements responsive to a change in the wager parameters 175, such as by a player interaction or due to occurrences in the live event. In some implementations, the interface generator 150 can update the second and third interactive elements 180B and 180C respectively, to include odds or a change in odds associated with the wager parameters 175. For example, a player may swipe the slider bar of the first interactive element 180A to select a wager parameter 175. Upon selection of the wager parameter 175, the interface generator 150 can display the odds associated with the selected wager parameter for a first outcome associated with the second interactive element 180B and a second outcome associated with the third interactive element 180C. The interface generator 150 can populate the graphical user interface using the wager parameter data structure including the odds for each wager parameter. The interface generator 150 can update the second interactive element 180B and the third interactive element 180C in a synchronized manner. A synchronized manner can refer to the interface generator 150 updating the interactive elements 180B and 180C simultaneously, at a predetermined delay between the two interactive elements, or in another planned or organized visual update.

In some implementations, the player may select a first wager parameter using the first interactive element 180A, and subsequently select a second wager parameter using the first interactive element 180A. The interface generator 150 can update the second and third interactive elements 180B and 180C, respectively, for each selected wager parameter 175. In this manner, the interface generator 150 can dynamically update the second interactive element 180B and the third interactive element 180C to include the updated first odds for the first outcome and updated second odds for the second outcome.

The interface generator 150 can update a second graphical user interface to indicate the wager responsive to a second interaction. In some implementations, the second graphical user interface can display a bet slip. The bet slip can indicate a wager for the live event. The bet slip can indicate a selection of an outcome based on the selected wager parameter. The interface generator 150 can receive a second interaction subsequent to the first interaction to select an outcome based on the selected wager parameter 175. In some implementations, the first interaction can be or include an interaction with a slider bar to select a wager parameter 175. The second interaction can be or include a selection of the second interactive element 180B or the third interactive element 180C associated with respective odds generated from the selected wager parameter 175. For example, the player may select a wager parameter 175 and then subsequently select either the first or second outcome based on the odds generated from the selected wager parameter 175. With a selection of the second interactive element 180B or the third interactive element 180C, the interface generator 150 can update the second graphical user interface to identify the outcome associated with the respective selected interactive element. For example, a selection of the second interactive element 180B can cause the interface generator 150 to generate a second graphical user interface indicating the wager identifying the second outcome.

The profile manager 160 can create, modify, or delete player profiles 170 stored within storage 115. The profile manager 160 can handle the storage and organization of player information, including account details, preferences, and wagering history, among others. The profile manager 160 can generate profile information based on data received from the client devices 120. This allows the profile manager 160 to capture activity across different wagering applications and different devices, and store records of that activity in the player profile 170. The profile manager 160 can provide live event statistics (e.g., historical game outcomes), and wagering statistics (e.g., historical wagers) to a requesting client device 120.

The profile manager 160 can update credit balances, game statistics, and other relevant information based on the outcomes of wagers placed by a client device 120. The profile manager 160 receives data about live event results or wager results from the client devices 120 or the statistics manager 140 and uses this information to make adjustments to the player's profile 170. For example, if a player wins a live event wager with a $10 wager, the profile manager 160 would increase their credit balance by the corresponding amount (the amount of the wager plus the win). Similarly, the profile manager 160 can record game statistics such as the number of wins, losses, and ties, as well as the player's average bet size, win percentage, and longest winning streak. This allows players to track their progress and review their wagering history. For example, a player could see that they have a 60% win rate for wagers relating to football and an average bet size of $10. This information could help the player make better decisions about how to bet in the future.

Referring now to FIG. 2A in the context of the components described in connection with FIGS. 1A and 1B, a graphical user interface 202 and a graphical user interface 204 are presented on a client device 120, for example, in response to a request for to place a wager. As discussed above, the device communicator 130 facilitates communication between the client device 120 and the data processing system 105, allowing players to interact with the graphical user interface 202 and transmit their actions to the data processing system 105. As players engage with the graphical user interface 202 or the graphical user interface 204, their actions, such as placing bets or submitting a bet slip, may be captured and stored in their player profile 170.

As depicted in FIG. 2A, the graphical user interface 202 displays a listing of types of wagers a player can place for a National Football League (NFL) game. In some implementations, the types of wagers can include an alt spread 206 (sometimes herein referred to as an alternate spread 206). The alt spread can include a first interactive element referred to as an interactive slider bar 208. In the provided illustration, the interactive slider bar 208 is a horizontal bar displaying an ordered series of values. The interactive slider bar 208 enables the player to select a value from the ordered series of values displayed by the graphical user interface 202 by sliding the bar. In some implementations, the first interactive element may be represented in a different form. For example, in some implementations, the first interactive element can be a scroll bar, a slider, a text-entry box, a drop-down selection menu, or any other type of graphical user interface element that enables a player to select a position in a list of values. In this example, the series of values represented via the interactive slider bar 208 can be referred to as a subset of wager parameters.

The graphical user interface 204 displays a listing of live events associated with an alternate spread. The graphical user interface 204 depicts a first live event 210 between the Washington Commanders and the Detroit Lions, and a second live event 212 between the New Orleans Saints and the Tennessee Titans. In some implementations, a player can select one or more of the live events to place a wager on. The player can place a wager by selecting a value from the slider bar 208 for one or more of the live events, or the player can select a live event to see further detail about the live event.

A player can interact with the graphical user interface 202 or 204 to place a wager. Any type of wagering interface may be utilized to place a wager for the game, including, for example, via the second graphical user interface discussed in reference to FIG. 1. In the example graphical user interface 202 or 204 shown in FIG. 2A, a player can interact with the slider bar 208 to select a value correlating to a wager prior to commencement or during the live event. The wager information is then transmitted from the client device 120 to the data processing system 105. The data processing system 105 receives and processes the wagers. The player profile 170 is also updated with the wager information.

Referring now to FIG. 2B in the context of the components described in connection with FIGS. 1A and 1B, a depiction of the first interactive element 208, a second interactive element 214, and a third interactive element 216 is displayed. The interactive elements 208, 214, and 216 can be displayed by or included in either of the graphical user interfaces 202 or 204 of FIG. 2A. The second interactive element 214 and the third interactive element 216 can be associated with or include various attributes. In this depiction, the second interactive element 214 can include a team name 218 (e.g., the Washington Commanders) associated with a team of the live event, a first odds value 220 (e.g., −120), and a wager parameter 222 (e.g., a spread value of −1.5). The third interactive element 216 can include a team name 224 (e.g., the Detroit Lions), a second odds value 226 (e.g., −121), and a wager parameter 228 (e.g., +1.5).

The data processing system 105 enables the player to select a specific value from the series of values shown by the interactive slider bar 208. The player can select the specific or selected value by interacting with the interactive slider bar 208. In some implementations, the player can drag the interactive slider bar 208 to select a value. As depicted in FIG. 2A, the slider bar includes a selected value 232 (e.g., 1.5) and one or more unselected values 230 (e.g., 1.0, among others). The selected value 232 can be indicated as selected by the player using the slider bar 208. In some implementations, the selected value 232 can be highlighted, boldened, circled, or otherwise graphically indicated as the selected value 232 over the unselected values 230. Likewise, the unselected values 230 can be minimized, grayed-out, or otherwise made to stand out less than the selected value 232. In some implementations, the selected value 232 may be displayed at the center of the slider bar 208 on the graphical user interface.

The graphical user interface 202 displays the second interactive element 214 and the third interactive element 216 that enable a player to select an outcome for the wager. The second interactive element 214 and the third interactive element 216 is each associated with a specific outcome and provides relevant information, such as the wager parameters 222 or 224 associated with the outcome. For example, the second interactive element 214 displays the first odds 220 as −120, indicating a probability associated with the outcome. The data processing system can update the odds 220 and 228 respective to the selected value 232. For example, the selected value 232 of 1.5 can correspond to the first odds 220 being −120 and the second odds 226 being −121, but a different selected value could correspond to different odds for each of the second interactive element 214 and the third interactive element 216. The data processing system 105 can determine the respective odds for any selected value of the interactive slider bar 208. In some implementations, the data processing system 105 can store the odds associated with each value of the interactive slider bar 208 in data structures associated with the values. The interactive elements 214 and 216 can provide information about the selected value 232. The selected value 232 can correspond to the displayed wager parameters 222 and 224 for the second interactive element 214 and the third interactive element 216, respectively. For example, the selected value 232 of 1.5 can correspond to or be reflected by the wager parameter 222 of −1.5 and the wager parameter 228 of +1.5.

After receiving a selection of the selected value 232, the graphical user interface can update the second interactive element 214 and the third interactive element 216 to reflect the selected value 232. Upon changing the selected value (e.g., via swiping the slider bar 208 again) the graphical user interface can update the second interactive element 214 and the third interactive element 216 to reflect the updated selected value. For example, upon selection of a subsequent selected value, the wager parameters 222 and 228 can be updated to reflect the subsequent selected value. Furthermore, the odds 220 and 226 can be updated to reflect the subsequent selected value. The attributes of the interactive elements 214 and 216 (e.g., the odds 220 and 226, the names 218 and 224, and the wager parameters 222 and 228) can be updated dynamically as the selected wager parameter changes. For example, upon the player swiping the slider bar 208 to select a value, the wager parameters 222 and 228 may update as the slider bar 208 changes through values. Likewise, the odds 220 and 226 may update as the player slides the slider bar to select a value. For example, as the player slides the slider bar 208 to the left, the values of the slider bar 208 may increment and the wager parameters 222 and 228 may simultaneously or synchronously increment.

Referring to FIG. 2C in the context of the components described in connection with FIGS. 1A and 1B, illustrated is a portion of the graphical user interface 202 or the graphical user interface 204 presented on the client device 120 following a selection of a "View More" element. Upon selecting "View More" by the player, the data processing system 105 generates a set of interactive elements 234 beyond the second interactive element 214 and the third interactive element 216. Each of the set of interactive elements 234 can include attributes similar to those described in conjunction with the second interactive element 214 and the third interactive element 216, such as team name, odds, and wager parameters. In some embodiments, the set of interactive elements 234 can include further outcomes based on the selected wager parameter 232. The player can interact with the second interactive element 214, the third interactive element 216, or one of the set of interactive elements 234 to select an outcome for the wager. Selecting an outcome for the wager can cause the data processing system 105 to generate a second graphical user interface indicating the selection of the outcome.

The graphical user interface 202 or 204 is dynamically updated to reflect any changes in the values or the odds, such as the player's selected value 232, the player's selected outcome, the odds associated with the selected value 232, or the values of the slider bar 208. After a selection of an outcome through an interaction with an interactive element, the data processing system 105 can update the graphical user interface 202 or 204 to display a bet slip. The bet slip can include the selected value 232, the odds associated with the selected wager parameter 232, and a team name. Upon presentation of the bet slip, the player can select to submit the bet slip to enter a wager for the live event.

Figure 3:
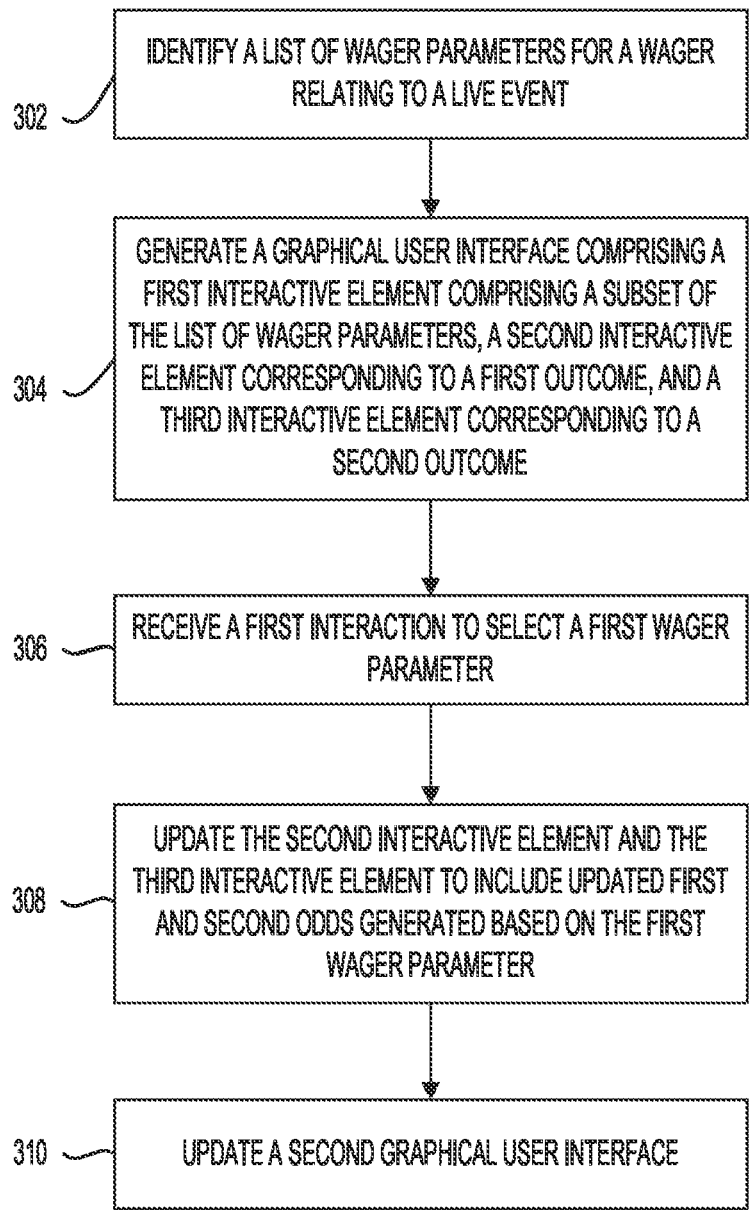
FIG. 3 illustrates an example flow diagram of a method for providing graphical user interfaces for participation in wagers relating to live events, in accordance with one or more implementations.

Referring now to FIG. 3, depicted is an illustrative flow diagram of a method 300 for providing graphical user interfaces for participation in wagers relating to live events. The method 300 can be executed, performed, or otherwise carried out by a wagering server or wagering system. A wagering server (e.g., the data processing system 105) can be remote to one or more client devices and communicate with the one or more client devices via a computer network. In a brief overview of method 300, the data processing system (e.g., the data processing system 105) can identify a list of wager parameters for aw ager relating to a live event (STEP 302), generate a graphical user interface comprising a first interactive element comprising a subset of the list of wager parameters, a second interactive element corresponding to a first outcome, and a third interactive element corresponding to a second outcome (STEP 304), receive a first interactive to select a first wager parameter (STEP 306), update the second interactive element and the third interactive element to include updated first and second odds generated based on the first wager parameter (308), and update a second graphical user interface (STEP 310).

In further detail of method 300, the data processing system can identify a list of wager parameters for a wager relating to a live event (STEP 302). The data processing system can identify the list of wager parameters from a remote server. In some implementations, the data processing system can receive the wager parameters for a live event from the remote server, or the data processing system can retrieve the wager parameters for the live event from the remote server. The data processing system can receive or retrieve the wager parameters periodically (e.g., every second or minute), upon a selection of a wager or live event, upon selection of a wager parameter through the first interactive element 180A, or upon a change in the wager parameters at the remote server.

The data processing system can identify the list of wager parameters based on the event type of the live event. For example, data processing system can maintain different wager parameters for different types of events, such as a first set of wager parameters for a hockey game and a second set of wager parameters for a football game. The data processing system can identify the wager parameters upon a player making a selection of an event type of the live event. For example, the player may select for live events relating to basketball. Thereby, the data processing system can identify the wager parameters relating to basketball.

The data processing system can generate a graphical user interface comprising a first interactive element comprising a subset of the list of wager parameters, a second interactive element corresponding to a first outcome, and a third interactive element corresponding to a second outcome (STEP 304). The data processing system can cause a presentation of the graphical user via a client device (e.g., the client device 120). In the example implementation shown in FIGS. 2A-2C, the data processing system can transmit instructions to the client device 120, causing the client device 120 to present a graphical user interface that includes a first interactive element enabling the player to select a wager parameter from the identified list of wager parameters. In some implementations, the data processing system can present the graphical user interface via a display device. The data processing system can present the first interactive element as an interactive slider bar, wheel, or a scroll bar. The interactive slider bar can enable the player to select a wager parameter from a subset of the list of wager parameters by swiping the bar in either direction on the graphical user interface. In this way, the interactive slider bar can be a bidirectional slider bar.

The second and third interactive elements can enable the player to select an outcome. The second interactive element can be associated with a first outcome and the third interactive element can be associated with a second outcome. The player can select an outcome by interacting with one of the second interactive element or the third interactive element. In some implementations, additional or alternative interactive elements may be provided for the first and second interactive elements, including menus, drop-down lists, radio bubbles, check boxes, text-entry fields, or any other type of graphical user interface element that may receiver user input or selections. In some implementations, additional or alternative interactive elements including additional outcomes may be presented via the graphical user interface for the user to interact with to select an outcome.

The data processing system can receive a first interaction to select a first wager parameter (STEP 306). The first wager parameter can be a selected wager parameter. The player can provide a first interaction by interacting with the first interactive element. For example, the player can select the first wager parameter by swiping the interactive slider bar. The interactive slider bar can enable the player to select a wager parameter from a subset of the list of wager parameters by swiping the slider bar in either direction on the graphical user interface. Swiping the bar in either direction can refer to swiping a horizontal bar between left and right, a vertical bar from up and down, a wheel clockwise or counterclockwise, or any other two opposing directions in accordance with the display of the first interactive element.

Selecting the first wager parameter can cause the graphical user interface to generate an indication to identify the first wager parameter. For example, the graphical user interface can highlight, change the color of, bolden, italicize, or otherwise indicate the selection of the first wager parameter. In some implementations, the selected wager parameter can be displayed at a center of the slider bar.

The data processing system can update the second interactive element and the third interactive element to include updated first and second odds generated based of the first wager parameter (STEP 308). In some implementations, the data processing system can calculate, associate, or otherwise determine a corresponding odds value for each of the second interactive element and the third interactive element based on the selected wager parameter. The data processing system can update the second and third interactive elements to indicate or include their respective odds. Updating the second and third interactive elements can include updating a presentation of the second and third elements on the graphical user interface. For example, the data processing system can cause the graphical user interface to display the odds within their respective second and third interactive elements. The odds can be displayed numerically, and in a variety of colors. In some implementations, the wager parameter or the odds can be displayed based on a color associated with the live event. For example, the wager parameter can be a color associated with the favorite team of a live event.

The data processing system can update a second graphical user interface (310). The data processing system can update the second graphical user interface responsive to a second interaction with the graphical user interface to select an outcome associated with either the second interactive element or the third interactive element. In some implementations, the data processing system can update the second graphical user interface to display a bet slip based on the selected outcome. For example, the second graphical user interface can include information related to the wager on the live event, such as the selected wager parameter, the selected outcome, the odds associated with the selected wager parameter, or an award amount associated with the wager. Generating the bet slip can submit the wager for the live event or enable the player to submit the wager for the live event.

Figure 4:
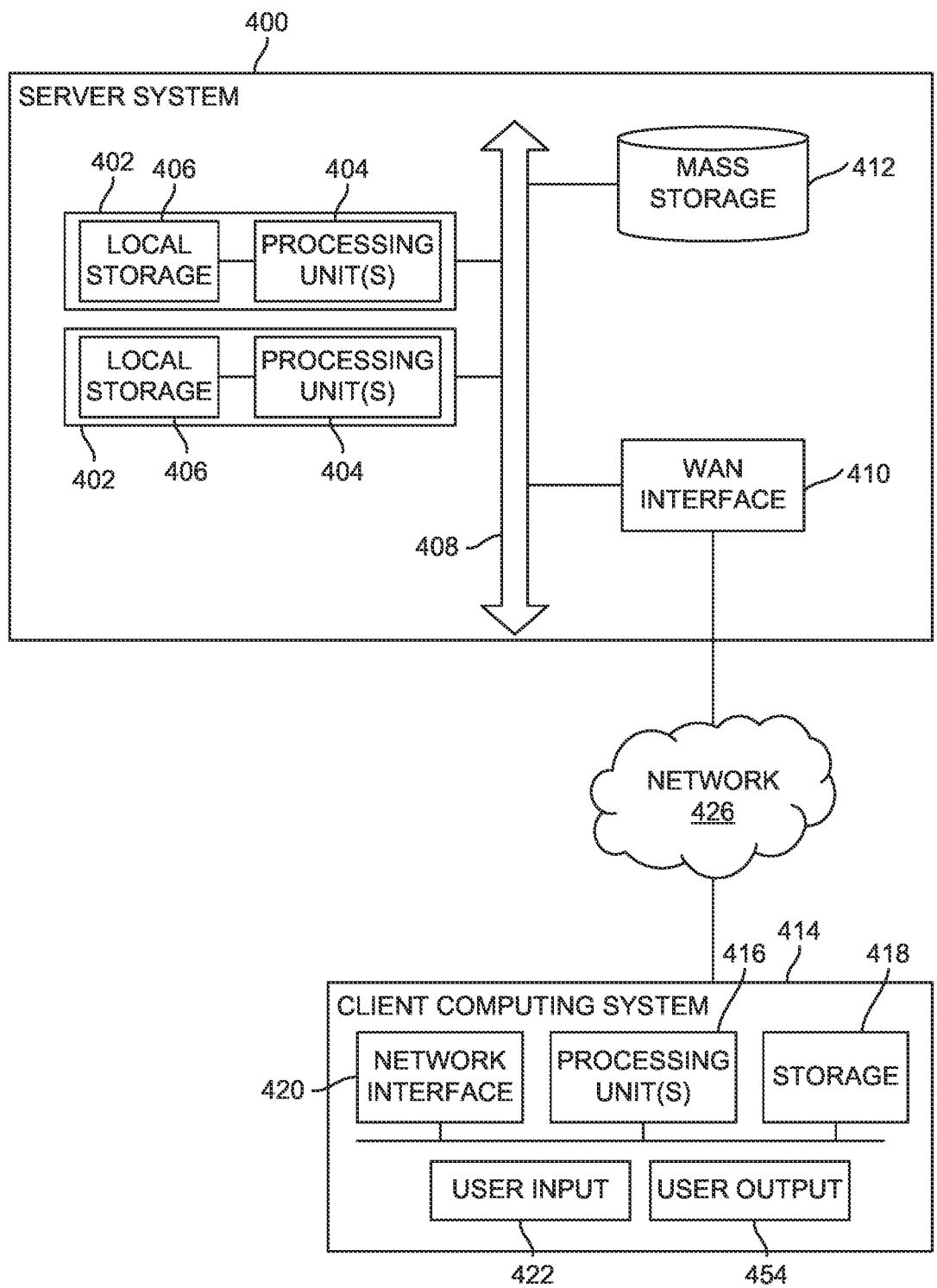
FIG. 4 illustrates a block diagram of a server system and a client computer system in accordance with an illustrative implementation.

Various operations described herein can be implemented on computer systems. FIG. 4 shows a simplified block diagram of a representative server system 400, client computer system 414, and network 426 usable to implement certain implementations of the present disclosure. In various implementations, server system 400 or similar systems can implement services or servers described herein or portions thereof. Client computer system 414 or similar systems can implement clients described herein. The system (e.g., the data processing system 105) and others described herein can be similar to the server system 400.

Server system 400 can have a modular design that incorporates a number of modules 402; while two modules 402 are shown, any number can be provided. Each module 402 can include processing unit(s) 404 and local storage 406.

Processing unit(s) 404 can include a single processor, which can have one or more cores, or multiple processors. In some implementations, processing unit(s) 404 can include a general-purpose primary processor as well as one or more special-purpose co-processors such as graphics processors, digital signal processors, or the like. In some implementations, some or all processing units 404 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 404 can execute instructions stored in local storage 406. Any type of processors in any combination can be included in processing unit(s) 404.

Local storage 406 can include volatile storage media (e.g., DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 406 can store one or more software programs to be executed by processing unit(s) 404, such as an operating system and/or programs implementing various server functions such as functions of the data processing systems 105 of FIG. 1 or any other system described herein, or any other server(s) associated with the data processing systems 105, or any other system described herein.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and the network 426, such as the Internet. Technologies can be used, including wired (e.g., Ethernet, IEEE 802.3 standards) and/or wireless technologies (e.g., Wi-Fi, IEEE 802.11 standards).

In some implementations, local storage 406 is intended to provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. In some implementations, additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Work allocation techniques can be used. As requests are processed, results can be returned to the requester via WAN interface 410. Such operation can generally be automated. Further, in some implementations, WAN interface 410 can connect multiple server systems 400 to each other, providing scalable systems capable of managing high volumes of activity. Techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to the network 426, such as a wide area network (e.g., the Internet) to which WAN interface 410 of server system 400 is also connected. In various implementations, network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. In various implementations, user input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with implementations of the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor can receive instructions and data from a read-only memory or a random access memory or both. The elements of a computer include a processor for performing actions in accordance with instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the system described herein can include clients and servers. For example, the system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

The systems and methods described herein may be embodied in other specific forms without departing from their characteristics thereof. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced there.

What is claimed is:

1. A system, comprising:
one or more processors coupled to non-transitory memory, the one or more processors configured to:
identify a list of wager parameters for a wager relating to a live event;
generate a graphical user interface comprising a first interactive element comprising at least a subset of the list of wager parameters, a second interactive element corresponding to a first outcome of the wager, and a third interactive element corresponding to a second outcome of the wager;
receive a first interaction with the first interactive element to select a first wager parameter from the list of wager parameters;
dynamically update the second interactive element and the third interactive element to include updated first odds for the first outcome and updated second odds for the second outcome, respectively, the updated first odds and the updated second odds generated based on the first wager parameter; and
update a second graphical user interface to indicate the wager identifying the first outcome or the second outcome in response to a second interaction with the second interactive element or the third interactive element, respectively.

2. The system of claim 1, wherein the one or more processors are further configured to identify the list of wager parameters by receiving the list of wager parameters from one or more servers.

3. The system of claim 1, wherein the one or more processors are further configured to identify the list of wager parameters by selecting the list of wager parameters based on an event type of the live event.

4. The system of claim 1, wherein the first interactive element comprises a slider bar displaying the subset of the list of wager parameters.

5. The system of claim 4, wherein the slider bar is a bidirectional slider bar that is configured to enable selection of the first wager parameter via a bidirectional swipe interaction.

6. The system of claim 4, wherein the one or more processors are further configured to update the first interactive element to indicate the first wager parameter as being selected via the first interaction.

7. The system of claim 6, wherein the first interaction is the swipe interaction corresponding causing the first graphical element to present a series of the list of wager parameters in order.

8. The system of claim 1, wherein the first interaction comprises a tap interaction, a click interaction, or a swipe interaction.

9. The system of claim 1, wherein the one or more processors are further configured to:
maintain a data structure storing odds for each wager parameter of the list of wager parameters; and
populate the graphical user interface using the data structure.

10. The system of claim 1, wherein the one or more processors are further configured to:
receive an update to respective odds values associated with the first wager parameter; and
update the second interactive element and the third interactive element to indicate the respective odds values associated with the first wager parameter.

11. The system of claim 1, wherein the second graphical user interface displays a bet slip, and wherein the one or more processors are further configured to update the bet slip to indicate the wager.

12. The system of claim 1, wherein updates to the second interactive element and the third interactive element are synchronized and responsive to the first interaction with the first interactive element.

13. A method, comprising:
identifying, by one or more processors coupled to non-transitory memory, a list of wager parameters for a wager relating to a live event;
generating, by the one or more processors, a graphical user interface comprising a first interactive element comprising at least a subset of the list of wager parameters, a second interactive element corresponding to a first outcome of the wager, and a third interactive element corresponding to a second outcome of the wager;
receiving, by the one or more processors, a first interaction with the first interactive element to select a first wager parameter from the list of wager parameters;
dynamically updating, by the one or more processors, the second interactive element and the third interactive element to include updated first odds for the first outcome and updated second odds for the second outcome, respectively, the updated first odds and the updated second odds generated based on the first wager parameter; and
updating, by the one or more processors, a second graphical user interface to indicate the wager identifying the first outcome or the second outcome in response to a second interaction with the second interactive element or the third interactive element, respectively.

14. The method of claim 13, comprising:
identifying, by the one or more processors, the list of wager parameters by receiving the list of wager parameters from one or more servers.

15. The method of claim 13, comprising:
identifying, by the one or more processors, the list of wager parameters by selecting the list of wager parameters based on an event type of the live event.

16. The method of claim 13, wherein the first interactive element comprises a slider bar displaying the subset of the list of wager parameters.

17. The method of claim 13, wherein the first interaction comprises a tap interaction, a click interaction, or a swipe interaction.

18. The method of claim 13, comprising:
   receiving, by the one or more processors, an update to respective odds values associated with the first wager parameter; and
   updating, by the one or more processors, the second interactive element and the third elements to indicate the respective odds values associated with the first wager parameter.

19. The method of claim 13, wherein the second graphical user interface displays a bet slip, and comprising updating, by the one or more processors, the bet slip to indicate the wager.

20. The method of claim 13, wherein updates to the second interactive element and the third interactive element are synchronized and responsive to the first interaction with the first interactive element.

\* \* \* \* \*